Dec. 5, 1961 S. F. FLYNN Re. 25,094

EGG TRAY

Original Filed Sept. 26, 1956

INVENTOR

Stanley F. Flynn

BY

W. J. Eccleston

ATTORNEY

United States Patent Office

Re. 25,094
Reissued Dec. 5, 1961

25,094
EGG TRAY

Stanley F. Flynn, Malvern, Pa.

Original No. 2,867,343, dated Jan. 6, 1959, Ser. No. 612,339, Sept. 26, 1956. Application for reissue Feb. 2, 1960, Ser. No. 6,333
8 Claims. (Cl. 217—27)
(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein, if patented, may be manufactured and used by or for the Government for governmental purposes, without the payment to me of any royalty thereon.

This invention relates to crate fillers or trays, sometimes called "egg case flats," which are to be assembled with other like fillers or trays within a crate, to make it possible to ship eggs, Christmas tree ornaments and other frangible articles placed in the crate without breakage. The principal object is to provide a filler or tray which will afford extraordinary protection to the articles. A further object is to save cubical space occupied by the assemblage of trays within a crate, so that either smaller crates may be used or else more space will be available in a standard-sized crate for cushioning material, heat-insulation, etc. Another object is to provide a filler or tray which may be of one-piece construction, hence may be molded of a suitable plastic, thereby saving assembling labor and costs. A still further object is to provide an article of the character indicated which is long-lasting, that is, capable of withstanding rough usage for some years, in this respect being a very great improvement over the flimsy molded pulp fillers often used in commerce. Another object is to provide a filler or tray which may be washed with hot water and a detergent or antiseptic solution to remove dirt and destroy bacteria or vermin. Other objects will be understood from the following description of a preferred embodiment of the invention, which is shown in the accompanying drawings forming a part of this specification.

Figure 1:
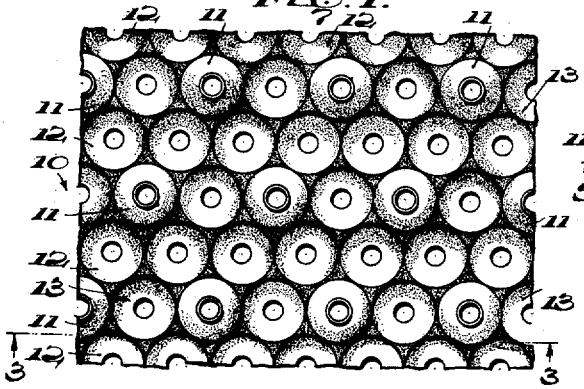
FIG. 1 is a top plan view of a part of a tray or flat embodying the invention.
Figure 4:
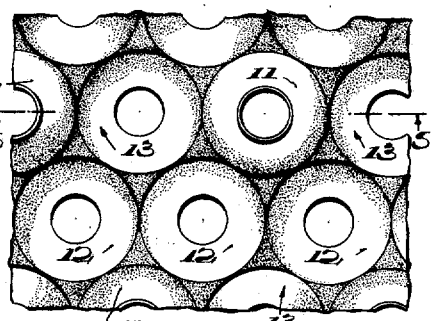
FIG. 4 is a top plan view on a larger scale of part of the tray or flat shown in FIG. 1.

Referring first to FIGS. 1–5 inclusive, I have shown a tray or filler comprising a flat plate 10 which is made of some fairly rigid and strong, light, easily washed material such as clear polystyrene, "Lucite," or hard rubber, having a multiplicity of flexible hollow article-supporting tubes 11 fixed to and projecting above the upper surface of plate 10, and a multiplicity of hollow article-supporting tubes 12 fixed to and projecting below the under surface of plate 10. The plate may be about one-eighth of an inch thick, or may be thicker if desired, and it will be as wide and as long as is necessary to accommodate the desired number of eggs or other frangible articles to be carried on and protected by the tray. The articles are arranged in straight rows, each seated endwise in a seat provided by a perforation 13 in the tray, and each supported or potentially supported on opposite sides by two tubes 11. Also the articles receive support from six tubes 12 projecting downwardly from the tray 10 located directly above. It is contemplated that a single tray 10 may carry six dozen or 72 eggs or other articles, arranged eight in a row with nine rows. Other arrangements are possible: thus there may be 90 eggs on a tray, ten to a row with nine rows. The number of rows will always be odd when two or more trays are used together. This makes possible the use of a single model of tray arranged in a stack with the adjacent trays turned at 180° relative to each other. If six dozen or 72 eggs are on the tray, five trays will be needed to carry 30 dozen, the standard content of an egg crate, plus another tray at the top to protect the eggs on the tray next to the top. If there are 90 eggs on a tray, only four trays are necessary to carry the eggs, plus another tray to protect the topmost layer.

Figure 5:
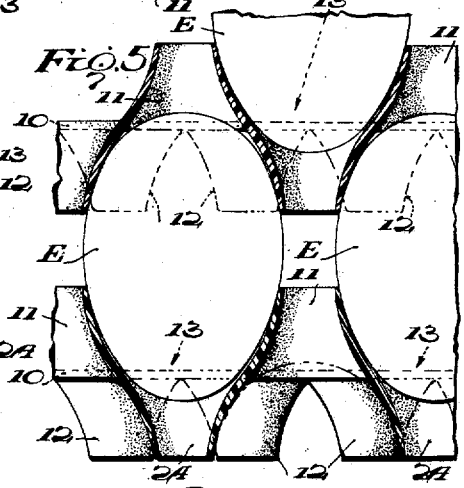
FIG. 5 is an enlarged section on line 5—5 of FIG. 4.
Figure 6:
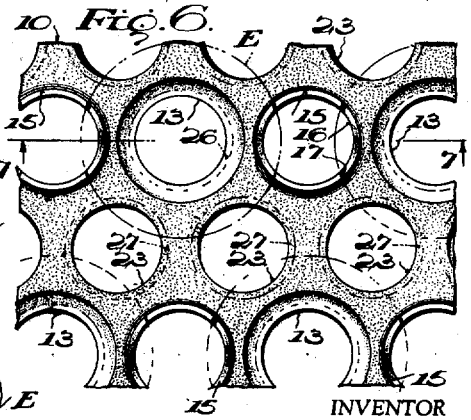
FIG. 6 is a top plan view, on the scale of FIG. 4, of another form of tray or flat embodying the invention.
Figure 8:
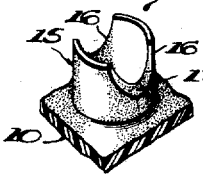
FIG. 8 is a detail in perspective showing one of the article-supporting tubes of FIGS. 6 and 7.
Figure 9:
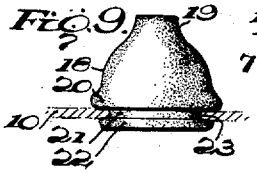
FIG. 9 is an elevation of still another form of article-supporting member.
Figure 7:
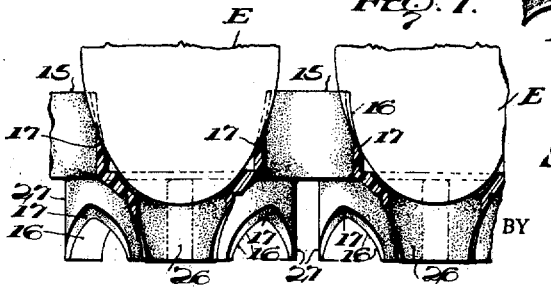
FIG. 7 is a section on line 7—7 of FIG. 6.

The flexible, resilient, hollow tubes mentioned above may have many different shapes, three of which are illustrated in the accompanying drawings. In FIGS. 1–5 inclusive, tubes 11 and 12 are shown as secured to the tray or plate 10, which may be effected by heat fusion or an adhesive or by molding. Tubes 11 and 12 have a generally frusto-conical shape but with a slight inward curvature to more or less accommodate the tubes to the curved surfaces of the eggs E. In FIGS. 6, 7 and 8, the tubes 15 are straight flexible tubes also integral with tray 10, but have cut-aways 16 on opposite sides with beveled edges 17 to receive and contact the walls of the eggs. In FIG. 9, the tube 18 is of a somewhat "beehive" shape, terminating in a narrow neck 19 at the upper end. At its lower end, tube 18 has a swelling or flange 20, a reduced portion 21 and a flange 22 spaced from flange 20 by the length of reduced portion 21. Tube 18 is so flexible that it may be collapsed or flattened manually so that the lower end of the tube, while flattened, may be inserted in a perforation 23 provided in tray 10, and then the flanges 20 and 22 will resiliently lock the tube upon the tray, as FIG. 9 makes clear. Perforations 23 and perforations 13 are arranged alternately in the same straight row.

The three forms of tubes described above are specially for supporting and protecting eggs and other ovoidal objects, but if the objects have shapes unlike eggs, clearly the shapes of the tubes will be modified to permit the tubes to contact or nearly contact the objects when seated. However, it should be understood that continuous contact of the tubes with the sides of eggs, although shown in FIG. 5, is not necessary nor is it possible, as eggs are of a multiplicity of shapes and sizes, whereas the tubes must be standardized. The essential result is that the eggs contact the flexible tubes upon slight lateral or longitudinal movement in any direction, so that further movement is resiliently arrested and considerable further movement is so strongly resisted as to be impossible. It will also be understood that all the tubes, of whatever shape, may be detachably secured to the tray, as in FIG. 9, or may be integral therewith as in FIGS. 1–8, or may be secured thereto more or less permanently as by an adhesive not shown.

Figure 3:
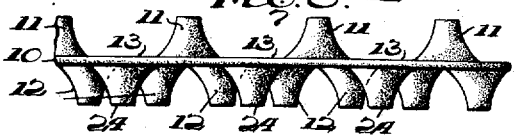
FIG. 3 is a section on line 3—3 of FIG. 1.

As FIGS. 1 and 3 show, the upwardly extending tubes 11 are arranged so that one of them is on each side of each egg or object E. The fragment of tray shown in FIG. 1 will carry nine eggs E, each egg being supported on end and contacting or nearly contacting the tubes 11 on either side. Tubes 11 terminate short of the medial transverse plane of the upended eggs, as shown in FIG. 5; however, they could extend all the way to said plane. The illustrated arrangement is preferred because it economizes on material and affords ample protection; in this arrangement, the tubes 11 extend for about two-thirds of the distance to the middle of the eggs. Each egg has its lower end seated in a circular aperture 13 whose diameter is such that the lower ends of the eggs project through the apertures. The smaller or more pointed the egg is, the farther it will project on the underside of the tray. On the other hand, extra large eggs may be supported by the resilient tubes 11 on each side, slightly out of contact with the seats 13. I prefer that seats 13 have a diameter of about one-half the diameter of large eggs (1⅞ in.) or about seven-eighths inch to one inch.

Figure 2:
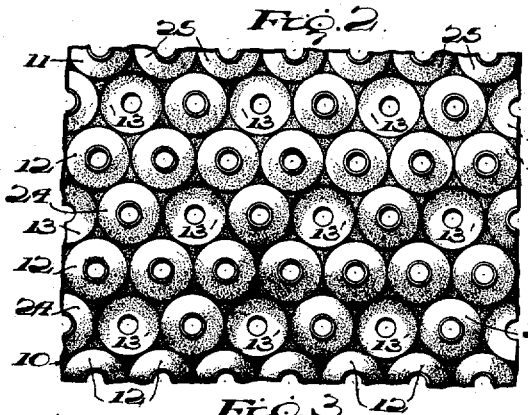
FIG. 2 is a bottom plan view of the same part.

The downwardly extending tubes 12, shown in FIGS. 2, 3 and 5, are preferably of the same shape and dimensions as tubes 11, and are arranged in close adjacency in continuous straight rows, each of which is between two rows of eggs E and their supporting tubes 11. Additionally, tubes 24 extend downwardly from each of the perforations 13, and preferably tubes 24 are in form exactly like tubes 12. The result is that each egg E seated on the seat provided by a perforation 13, is supported and protected by two tubes 11, on either side, and six tubes 12, 24 extending downwardly from the tray above, except the eggs in the border rows. The eggs in the border rows (FIG. 1) are supported by two tubes 11 and by four tubes 12, 24 from the tray above, also by two half tubes 25 (FIG. 2) projecting downwardly from the tray above adjacent its edges. The result is precisely the same: lateral support for each egg at six points provided by the tubes of the tray above, plus lateral support and perhaps longitudinal support provided by two tubes 11 of the tray on which the eggs rest, a total of eight resilient supports and protecting shields for each egg. It is believed that no other construction offers a protection to fragile articles equal to that offered by my invention.

What has been said of the form of FIGS. 1–5 is also true of the modification of FIGS. 6, 7 and 8. Straight tubes 15 extending upwardly on either side of apertures 13, in which the eggs are seated, provide lateral support on opposite sides of each egg. Similar straight tubes 26 extend downwardly from tray 10 in straight rows located between the rows of eggs. Other straight tubes 27 extend downwardly from the perforations 23 which are between the upwardly projecting tubes 15. All the tubes 15, 26, 27 are preferably of the same size and shape. There will be six lateral supports from tubes 26, 27 and two additional lateral supports from tubes 15 for a total of eight. There may be half tubes (not shown), as in the previously described form, to give full lateral support to the eggs in the border rows.

It will be understood that when the described egg tray is used in a crate, there may be either five or six of the trays stacked one above the other to support and protect thirty dozen eggs, the usual content of a commercial egg crate. The uppermost tray of the stack will have no eggs on top of it, but its upwardly extending tubular members will serve as resilient spacers. The lowermost tray of the stack will support eggs in its seats but no eggs will be below its lower surface, its downwardly extending tubular members serving as resilient spacers. The trays intermediate the uppermost and lowermost trays of the stack will protect and support eggs above and below, as will be understood from the drawings. Fiberboard layers or other cushioning and/or heat-insulating members (not shown because known to the prior art) may be placed above the uppermost tray and below the lowermost tray, and the crate may then be closed and prepared for shipment.

With each of the forms of tubes, the eggs in the crate are supported resiliently both endwise and laterally. The support is of such a nature that even if the egg crate is dropped, no eggs are likely to be cracked. As each egg extends through the tray on which it is supported and normally extends slightly through the tray above (FIG. 5) there will be a space saving which amounts to about one-seventh of the cubical space in the crate. This saving of space permits extra insulation or cushioning material to be laid in the crate, or if standard sized crates are not desired, this space saving permits using smaller crates. Thus the use of my tray may make possible better protection of eggs against extremes of temperature, careless handling of the crates, etc., or alternatively, a larger shipment of eggs and other articles in the same shipping space.

While a detailed description of several forms of trays has been given, obviously the invention is not limited to these details. The tubes may be so tapered that nesting of two or more of the trays is permitted to facilitate shipment and storage.

I claim:

1. In combination, at least two like trays adapted to be placed one directly above the other, the trays being adapted to be placed inside a crate or other container, each tray comprising a flat plate having perforations arranged in rows, each perforation being of sufficient size to receive and seat the lower end of a fragile object; a plurality of resilient flexible tubular object-supporting members fixed to said flat plate and extending upwardly therefrom whereby every object-seating perforation has one of said tubular members on either side; said tubular members being located and dimensioned so that the sides of the seated objects are either contacted by said tubular members or will be contacted upon slight tilting of said objects; and a plurality of resilient flexible tubular object-supporting members fixed to said flat plate and extending downwardly therefrom and into contact or near contact with the sides of an object seated on the next lower tray, there being six of said downwardly extending members for each object so seated; all of said tubular object supporting members being hollow with both ends open.

2. A tray adapted to be stacked with other like trays inside a crate or other container to support and protect a plurality of fragile objects against breakage comprising, in combination, a flat plate made of a relatively stiff material; a plurality of resilient flexible tubular members each fixed at one end to said flat plate and arranged in straight rows with the axes of said tubular members at right angles to the plane of said plate; article-seating perforations formed in the plate, there being one perforation between each pair of tubular members; the tubular members rising above said plate and being adapted to contact or nearly contact the sides of articles seated in said perforations; additional resilient flexible tubular members each fixed at one end to the flat plate and extending below the plane of said flat plate and having their axes at right angles to said plane; all of said tubular members being hollow with both ends open; the downwardly extending tubular members providing six lateral abutments surrounding each article that is supported in and is upstanding from a perforation of a like tray immediately below.

3. The invention defined in claim 2, wherein the perforations in said flat plate are of such dimensions that a substantial fraction of the article seated in each perforation extends below the plane of said flat plate.

[4. The invention defined in claim 2, wherein the tubular members are cylindrical hollow tubes open at both ends and having cut-aways on diametrically opposite sides extending from the free outer ends toward the fixed inner ends and adapted to receive the sides of ovoid or other articles seated adjacent to the tubular members.]

5. The invention defined in claim 2, wherein the tubular members are of least diameter at their free ends and have swellings or enlargements intermediate their ends, their secured ends having spaced flanges which fit over the plate above and below the perforations in the plate to secure the tubular members removably to the plate.

6. The invention defined in claim 2, wherein certain of those tubular members which extend below the plane of the flat plate have their upper ends adjoining perforations arranged in straight rows in the flat plate, said straight rows being between the rows of flexible tubular members that rise above said flat plate; the last-mentioned tubular members having their lower ends adjoining perforations provided in the flat plate, said last named perforations being adapted to receive the upper ends of articles seated in the perforations of a like tray immediately below.

*7. In combination, at least two like trays adapted to be placed one directly above the other, the trays being adapted to be placed inside a crate or other container, each tray comprising a flat plate having perforations arranged in rows, each perforation being of sufficient size to receive and seat the lower end of a fragile object; a plurality of resilient flexible object-supporting members fixed to said flat plate and extending upwardly therefrom whereby every object-seating perforation has one of said members on either side; said members being located and dimensioned so that the sides of the seated objects are either contacted by said members or will be contacted upon slight tilting of said object; and a plurality of resilient flexible object-supporting members fixed to said flat plate and extending downwardly therefrom and into contact or near contact with the sides of an object seated on the next lower tray, there being six of said downwardly extending members for each object so seated; all of said object-supporting members being hollow with both ends open.*

*8. A tray adapted to be stacked with other like trays inside a crate or other container to support and protect a plurality of fragile objects against breakage comprising, in combination, a flat plate made of a relatively stiff material; a plurality of resilient flexible tubular members each fixed at one end to said flat plate and arranged in straight rows with the axes of said tubular members at right angles to the plane of said plate; article-seating perforations formed in the plate, there being one perforation between each pair of tubular members; the tubular members rising above said plate and being adapted to contact or nearly contact the sides of articles seated in said perforations; additional resilient flexible tubular members each fixed at one end to the flat plate and extending below the plane of said flat plate and having their axes at right angles to said plane; all of said tubular members being hollow with both ends open; the downwardly extending tubular members providing six lateral abutments surrounding each article that is supported in and is upstanding from a perforation of a like tray immediately below, said tubular members being hollow tubes open at both ends and having cut aways on opposite sides extending from the free outer ends toward the fixed inner ends and adapted to receive the sides of ovoid or other articles seated adjacent to the tubular members.*

*9. A tray adapted to be stacked with other like trays inside a crate or other container to support and protect a plurality of fragile objects against breakage comprising; in combination, a flat plate made of a relatively stiff material; a plurality of resilient flexible tubular members each fixed at one end to said flat plate and arranged in straight rows with the axes of said tubular members at right angles to the plane of said plate; article-seating perforations formed in the plate, there being one perforation between each pair of tubular members; the tubular members rising above said plate and being adapted to contact or nearly contact the sides of articles seated in said perforations; additional resilient flexible tubular members each fixed at one end to the flat plate and extending below the plane of said flat plate and having their axes at right angles to said plane; all of said tubular members being hollow with both ends open; the downwardly extending tubular members providing six lateral abutments surrounding each article that is supported in and is upstanding from a perforation of a like tray immediatelly below, said tubular members being hollow tubes open at both ends and having cut aways on opposite sides extending from the free outer ends toward the fixed inner ends and adapted to receive the sides of ovoid or other articles seated adjacent to the tubular members.*

References Cited in the file of this patent or the original patent

UNITED STATES PATENTS

| | | |
|---|---|---|
| 1,254,755 | Wilson | Jan. 29, 1918 |
| 1,970,436 | Shepard | Aug. 14, 1934 |
| 2,045,771 | Graham | June 20, 1936 |
| 2,078,927 | Dorr | May 4, 1937 |
| 2,922,541 | Martelli et al. | Jan. 26, 1960 |

FOREIGN PATENTS

| | | |
|---|---|---|
| 490,230 | Canada | Feb. 3, 1953 |